(12) United States Patent
Iyengar et al.

(10) Patent No.: US 6,349,213 B1
(45) Date of Patent: Feb. 19, 2002

(54) APPARATUS FOR ENHANCED VOICE QUALITY IN MULTIPLE CORDLESS HANDSET ENVIRONMENT AND METHOD

(75) Inventors: Vasu Iyengar, Allentown; Richard M. Ubowski, Harleysville, both of PA (US)

(73) Assignee: Agere Systems Guardian Corp., Miami Lakes, FL (US)

(*) Notice: Subject to any disclaimer, the term of this patent is extended or adjusted under 35 U.S.C. 154(b) by 0 days.

(21) Appl. No.: 09/332,514

(22) Filed: Jun. 14, 1999

(51) Int. Cl.[7] .................................................. H04Q 7/20
(52) U.S. Cl. ........................ 455/463; 455/462; 704/270
(58) Field of Search .......................... 455/426, 450–452, 455/462–465, 509, 526; 379/58–63; 704/212, 229–230, 219–220; 375/219

(56) References Cited

U.S. PATENT DOCUMENTS

| | | |
|---|---|---|
| 4,747,096 A | 5/1988 | Piasecki et al. |
| 5,050,601 A | 9/1991 | Kupersmith et al. |
| 5,228,076 A | 7/1993 | Hopner et al. |
| 5,297,203 A | 3/1994 | Rose et al. |
| 5,325,420 A | 6/1994 | Kikuchi |
| 5,367,570 A | 11/1994 | Figuerooa |
| 5,689,549 A | 11/1997 | Bertocci et al. |
| 5,754,642 A | 5/1998 | Domoto et al. |
| 5,784,456 A | 7/1998 | Carey et al. |
| 5,809,417 A * | 9/1998 | Nealon et al. ............... 455/426 |
| 5,855,003 A * | 12/1998 | Ladden et al. ............... 704/270 |
| 5,991,642 A * | 11/1999 | Watanabe et al. ........... 455/560 |
| 6,188,884 B1 * | 2/2001 | Lorieau et al. .............. 455/412 |

* cited by examiner

Primary Examiner—Nguyen T. Vo
Assistant Examiner—Duc Nguyen
(74) Attorney, Agent, or Firm—Dickstein Shapiro Morin & Oshinsky LLP

(57) ABSTRACT

The present invention provides a method and system to improving voice transmission quality within an environment containing multiple off-hook cordless telephones all residing on the same subscriber line. This is achieved by coordinating the sending, receiving, and acknowledging (i.e., handshaking) of control and telephone signals between the multiple cordless telephones and the base. The communication between cordless telephones takes place through a single household telephone line and the RF link existing between each cordless handset and its accompanying base station. When a single handset of a multiple handset cordless telephone system is registered as off-hook, the handshaking between that handset and base results in the transmission of voice signals between the off-hook handset and the base which are digitized using Adaptive Differential Pulse Code Modulation (ADPCM). When one or more handsets become active and are registered as off-hook, the transmission of voice signals between the off-hook handsets and base is accomplished through the use of speech coding at a lower rate than that of ADPCM coding. The successful switching between ADPCM and speech coding within a multiple handset environment allows for speech quality to be maximized at all times.

84 Claims, 4 Drawing Sheets

APPARATUS FOR ENHANCED VOICE QUALITY IN MULTIPLE CORDLESS HANDSET ENVIRONMENT AND METHOD

BACKGROUND OF THE INVENTION

1. Field of the Invention

This invention relates to cordless telephones and, more particularly, to a cordless telephone having a speech encoding/decoding switching system for use within a multiple handset environment.

2. Description of the Related Art

Cordless telephones have proven to be popular in domestic, business and industrial environments due to the unrestricted freedom of movement they offer users. In fact, in 1997, for the first time ever, sales of cordless telephones exceeded sales of corded telephones with total cordless units sold being in excess of 28 million. Furthermore, total sales for 1998 are expected to have increased over 1997 sales by at least 25 percent.

Standard cordless telephones route incoming and outgoing telephone signals through a base station which is hard wire connected to a telephone line. The base station communicates with the battery-operated handset using a wireless signal transmitted over a distance. That is, the physical hard wire connection between a conventional handset and telephone base is replaced by a radio frequency (RF) link, which can range from the 46 and 49 MHz bands to the more recent 900 MHz bands. The spoken voice is usually communicated between the base and handset by first converting the user's voice into an analog electrical signal and modulating the signal using an RF carrier for radio transmission to the receiver, typically through the use of a Narrow-Band Frequency Modulation (NBFM) technique. At the receiver, the modulated analog voice signal is demodulated and directed to a speaker through which the voice is heard. Outgoing telephone signals follow a reverse direction through generation at the handset, transmission to the base, and then routing to the outgoing phone line. The wireless transmission of the telephone signals between the handset and the base can occur over a range of wavelengths and to varying distances.

The quality of the wireless signal is of paramount importance to the user of a cordless telephone. The quality of a transmission between handset and base is limited by the size of the components and frequency of the signal. A more powerful transmitter results in a more powerful signal which can travel longer distances. However, such power comes with the attendant negative factors of bulky handsets and bases and shortened battery life. In addition, the bandwidth within which cordless telephones are limited is subject to interference from numerous electromagnetic sources.

Cordless telephone systems must, therefore, meet a basic standard of speech quality, often called "toll quality" speech. Toll quality speech transmission standards comprise the minimum bandwidth needed to assure recognition of the speaker by the receiver at the other end of the link in combination with at least 98% understandability of the speech in context. Originally, in telephone signals, the minimum bandwidth was 300 Hz to 3400 Hz, which resulted in 4 kHz frequency spacing for single sideband (SSB) cable and radio transmission. These standards have been preserved in digital transmission, using pulse code modulation (PCM), and are perpetuated in the increasingly common ISDN standard.

To provide toll quality speech transmission between the handset and the base, some cordless telephone systems rely on digital transmission of the analog telephone signal. This requires that a digital to analog coder/decoder chip ("codec") be placed in both the handset and the base. According to information theory, when PCM was discovered the sampling rate of an analog signal was set at 2 W for perfect recovery of signals having a bandwidth of less than W. In order to prevent foldover intermodulation distortion, the speech spectrum had to be strictly limited to less than 4 kHz. Thus, the sampling rate for voice telecommunications was set at 8 K samples/sec.

CCITT Recommendation G.726-1990 specifies how a digital telephone signal is to be compressed before transmission and how a received digital signal is to be expanded after reception using ADPCM. ADPCM is a technique for converting sound or analog information to binary information by taking frequent samples of the sound and expressing the value of the sampled sound modulation in binary terms. The G.726 standard specifics the functionality that is required for the receive (ADPCM decoder) and transmit (ADPCM encoder) signal processing functions. G.726 allows for the conversion of a 64 kilobit-per-second (kbps) pulse code modulation (PCM) channel to and from a 40, 32, 24, or 16 kbps ADPCM channel. G.726 incorporates the previously-existing G.721 (32 kbps) and G.723 (24 kbps) standards. In addition to cordless handsets, ADPCM is used to encode data on CD-ROMS and data transmitted over fiber-optic transmission lines.

While 8 Kb/s transmission rates meet a minimum level for speech comprehension, it is by no means an ideal transmission rate. An 8 Kb/s transmission rate transmits all vowels very well. However, transmission of consonants, which have main speech energies concentrated between 7 kHz to 8 kHz, is rudimentary at best. Generally, speech taken in context provides sufficient clues for good understandability, although unexpected words and names typically must be spelled in order to circumvent the lack of bandwidth in toll quality telephone connections. Thus, in general, telephone systems having a higher-fidelity transmission became desirable.

Current cordless telephone systems use an improved ADPCM which is capable of much higher quality transmissions. The ADPCM signal conversion device is conventionally known which compresses data and converts that data into PCM signals and further converts from the PCM signals into ADPCM signals. Transmitter side voice signals are compressed and coded in the form of ADPCM signals and then transmitted, and in which on the receiver side the ADPCM signals are expanded and demodulated into voice signals. ADPCM allows analog voice conversation to be carried within a 32 Kb/s digital channel. The sampling rate is 8,000 times per second and three or four bits are used to described each sample. At current transmission values, ADPCM provides a high quality transmission signal between a cordless telephone's handset and base.

Traditionally, to provide multiple handset use in telephone systems utilizing a single subscriber line, multiple sets of bases and handsets must be plugged into that line. Other solutions have involved using multiple hardwired telephones as described in U.S. Pat. No. 5,367,570 (Hector D. Figueroa). To reduce the amount of equipment necessary in such a case, multiple handset cordless telephones are currently available. Such systems allow multiple handsets to transmit and receive signals from a single base station. Such systems are highly desirable in cases in which there is a limited number of incoming lines or there is limited space for the base stations. Multiple handset cordless telephones operate in one of two ways when in use. Either a single handset is used and the other handsets are rendered inactive or any handset may be used to allow multiple participants to use the system. The latter case is preferable in that it mimics a standard telephone system in which multiple persons can speak on the same subscriber line using different telephones. For the concept of a multiple handset telephone to be commercially and practically useful, the system must support simultaneous transmission of signals from the multiple handsets.

Current multiple handset cordless systems which support the use of simultaneous off-hook handsets transmit speech between the handsets and base by using speech coding instead of ADPCM. The use of speech coding at a lower bit rate than ADPCM allows multiple communications signals to share the same frequency bandwidth. Speech coding is normally accomplished by a speech codec chip. A speech codec allows analog voice conversation to be carried within a 4, 8 or 16 Kb/s digital channel. This reduced transmission rate allows for multiple transmissions within a limited bandwidth, for example allowing 8, 4, or 2 handset units where only one existed previously on a 32 Kbit/s channel. However, transmission rates of 4, 8 or 16 Kb/s carry a significant penalty in term s of voice quality. Such a transmission is readily discernable from the 32 Kb/s experienced by single handset cordless systems using ADPCM.

One attempt to operate multiple handsets in communication with a single base station is described in U.S. Pat. No. 5,689,549 (Bertocci, et al.). A telephone system is described in which a time-sharing method is used to allow multiple, independent conversations to be carried on over each handset. While this allows for the use of ADPCM encoding in a multiple handset environment, it does not allow the multiple handsets to be used in the same conversation.

Currently, if multiple handsets are used with a single base station, speech coding or time-sharing techniques are used to transmit cordless telephone signals. Consequently, when such a system is used, reduced speech quality or reduced functionality is experienced in comparison to single-handset cordless telephone systems.

SUMMARY OF THE INVENTION

The present invention provides a method and apparatus for improving voice transmission quality within an environment containing multiple off-hook cordless handsets coupled to the same base station. This is achieved by coordinating the sending, receiving, and acknowledging (i.e., handshaking) of control and telephone signals between the multiple handsets and the base station. The communication between the handsets and the base station takes place through an RF link existing between each handset and the base station.

In accordance with the present invention, when a single handset of a multiple handset cordless telephone system is registered as off-hook, the handshaking between that handset and base station results in the transmission of voice signals between the off-hook handset and the base station which are digitized using Adaptive Differential Pulse Code Modulation (ADPCM). When one or more handsets become active and are registered as off-hook, the transmission of signals between the off-hook handsets and base station is accomplished through the use of speech coding and a time division duplex or frequency division duplex system. The successful switching between ADPCM and speech coding within a multiple handset environment allows for speech quality to be maximized at all times.

A cordless telephone system incorporating the present invention may be implemented without requiring additional wiring or a special connection to the existing telephone subscriber line. Furthermore, the invention may be incorporated into any cordless telephone that uses an RF link between its handset and its base station, allowing multiple handsets to be purchased at later date.

BRIEF DESCRIPTION OF THE DRAWINGS

The foregoing and other advantages and features of the invention will become more apparent from the detailed description of preferred embodiments given below with reference to the accompanying drawings, in which.

DETAILED DESCRIPTION OF PREFERRED EMBODIMENTS

A preferred embodiment of the present invention will now be described with reference to FIGS. 1–4. Other embodiments may be realized and structural, or logical changes may be made to and equivalents used for the disclosed embodiment without departing from the spirit or scope of the present invention.

Figure 1:
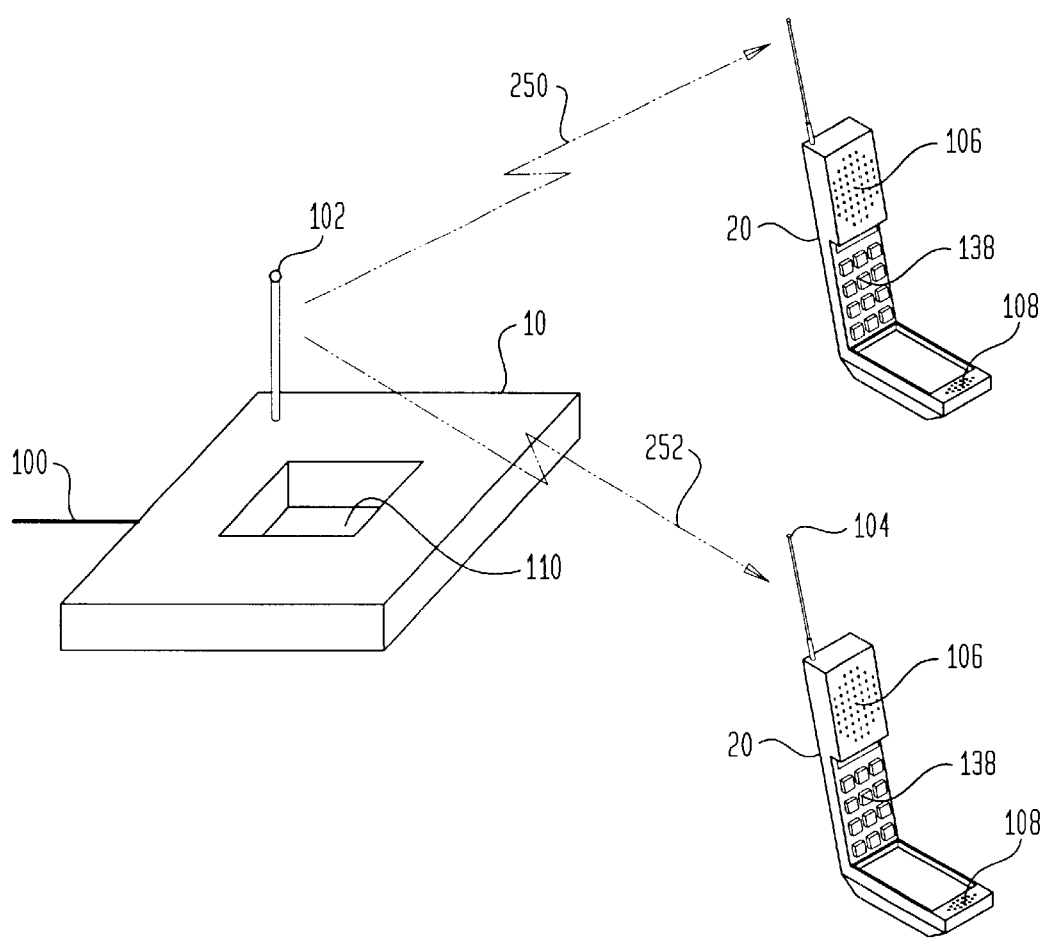
FIG. 1 illustrates a block diagram of a typical multiple handset cordless telephone system.

FIG. 1 depicts a typical multiple handset cordless telephone environment. The FIG. 1 environment consists of a subscriber telephone base station 10 plus a plurality of handsets, e.g. two handsets 20, 22, all of which are operating on the same subscriber telephone line 100 and within the same household. Communication between the base station 10 and the handsets 20, 22 is achieved via wireless transmission of signals. In FIG. 1, each of the handsets 20, 22 are off-hook and currently engaged in an open line communication with the base station 10. Each handset 20, 22 and the base station are depicted as being coupled together by an RF link 250, 252.

Also, in accordance with the disclosed embodiment, each of the handsets 20, 22 may independently communicate with each other as well as the base station 10, as described in detail later herein.

For establishing communications between the base station 10 and multiple active handsets 20, 22, the present invention may employ a frequency division duplex system or a time division duplex system, such as that described in U.S. Pat. No. 5,809,417 (Nealon et al.) and incorporated herein by reference. In a frequency division duplex system, for example, each one of the handsets 20, 22 is configured with a different starting channel from a plurality of communication channels available in a frequency hopping system. Frequency division duplexing is a multiplexing scheme in which the available transmission frequency range is divided into narrower bands. Each of these bands is used to carry a separate channel. For providing initial communications with the handsets 20, 22, the base station 10 transmits a broadcast signal sequentially over a set of communication channels while monitoring each one of the starting channels of each handset 20, 22. A user-initiated response from the handsets 20, 22 receiving the broadcast signal from the base station 10 causes a response signal to be transmitted from the handsets 20, 22 to the base station 10 over the respective starting channel of each handset 20, 22. The base station 10 and responding handset 20, 22 then establish communications over a set of communication channels assigned to the respective responding handset 20, 22.

A general overview of spread spectrum technology including frequency hopping systems is provided by R. C. Dixon, *Spread Spectrum Systems*, New York: John Wiley & Sons, 1984, incorporated herein by reference. The specific requirements for the frequency hopping system in which this cordless telephone is designed to operate arc set forth in a Report and Order in General Docket No. 89-354, this Report and Order being adopted by the Federal Communications Commission on Jun. 14, 1990 and released on Jul. 9, 1990, incorporated herein by reference.

Figure 2:
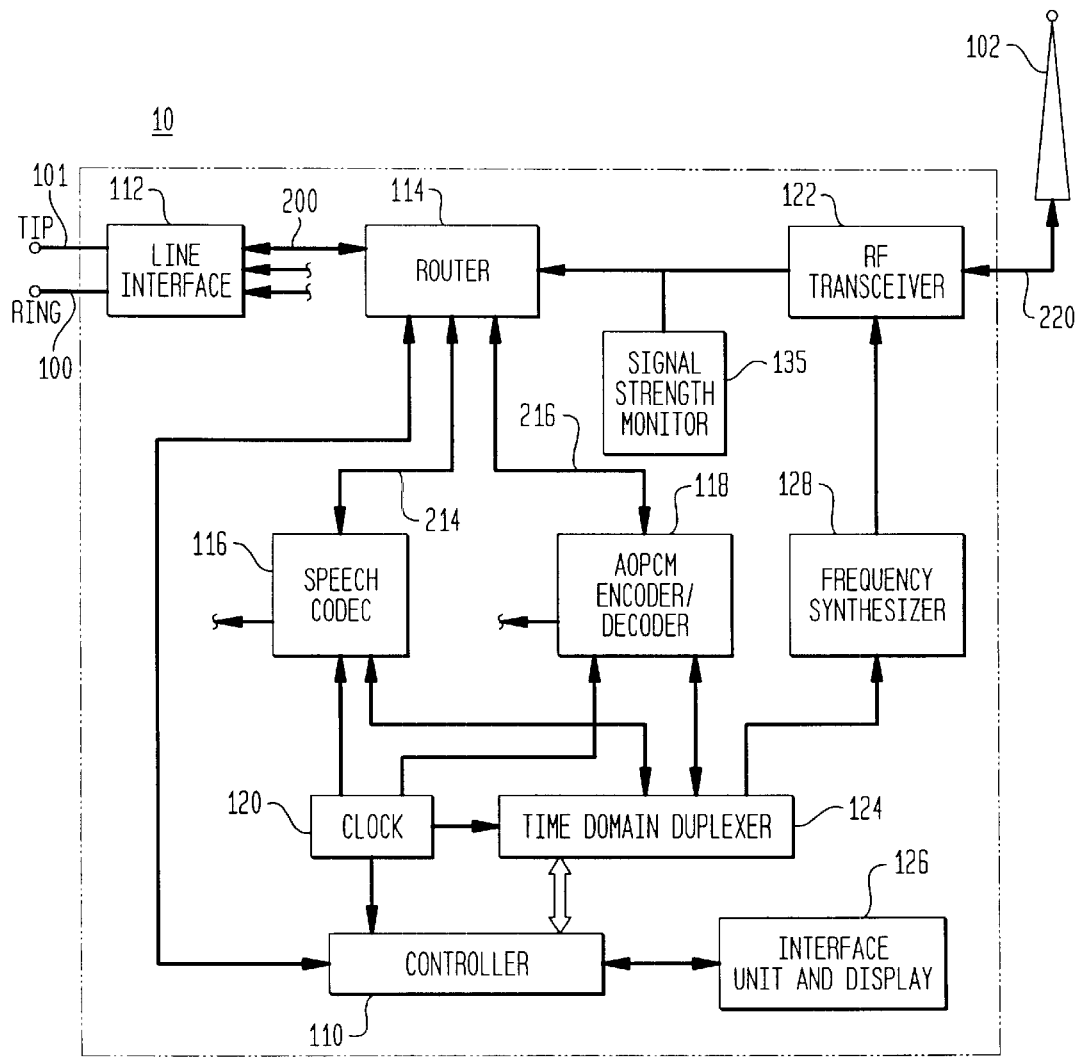
FIG. 2 a block diagram of circuitry located within a base station of the invention.

Turning now to FIG. 2, a block diagram of circuitry located within base station 10 is depicted. Included in the base station 10 are a control unit 110, a router 114, a clock 120 for providing synchronization to: 1) the control unit 110, 2) a time domain duplexer (TDD) 124 and 3) the speech codec 116 and ADPCM module 118. Also included in the base station 10 are a radio frequency (RF) transceiver 122, a signal strength monitor circuit 130, an antenna 102 and a frequency synthesizer 128. A line interface 112 in the base station 10 connects this unit to a central office or other appropriate switch through tip and ring lines 100 and 101. An interface unit and display 126 contains the switches and a visual display for configuring the base station in its various modes for communicating with one or more of the handsets 20, 22. The transceiver 122 comprises both an RF transmitter and an RF receiver. The transceiver 122 demodulates voice signals transmitted by the handsets 20, 22 and couples these signals via the router 114, preferably an analog switch controlled by the controller 110, and either the speech codec 116 or the ADPCM module 118 to the line interface 112. The transceiver 122 also has as its input speech and other control signals from the line interface 112 which are first coupled through the router 114 and either the speech codec 116 or the ADPCM module 118 before being transmitted to the handsets 20, 22 by the transceiver 122. The line interface 112 serves as a "plain old telephone service" (POTS) interface for signals on the tip-ring lines 100 and 101 and for those signals received from the handsets 20, 22 by the RF transceiver 122. The controller 110 advantageously provides a number of control functions and may be implemented through the use of a microcomputer containing read-only-memory (ROM), random-access-memory (RAM) and through use of the proper coding.

The controller 110 controls and configures the TDD 124. The controller 110 generates a pseudo-random data list and transmits the list to the TDD 124 where it is stored therein. The TDD 124, in turn, controls the frequencies selected in the frequency hopping cycle of the base station 10 by inputting into the frequency synthesizer 128 at the appropriate time the values stored in the data list generated by the controller 110. The TDD 124 also refreshes the frequency synthesizer 128 as the synthesizer progresses though the frequency hopping cycle.

In order for the base station 10 to achieve effective coverage throughout its operating range, the signal strength monitor circuit 135 continually monitors the strength of the received signal from the handsets 20, 22 during ongoing communications with the handsets 20, 22.

This signal strength monitor circuit 135 may be, for example, a received signal strength indicator (RSSI) circuit. This RSSI circuit produces an output voltage that is proportional to the strength of the received signal from the handsets 20, 22.

Responsive to the strength of the received signal from the handset 20, as determined by the signal strength monitor circuit 135, the controller 110 is capable of recalculating the amount of power transmitted by the transmitter in the RF transceiver 122 to the handsets 20, 22. Thus, when the handsets 20, 22 are in close proximity to the base station 10, the level of power radiated by the RF transceiver 122 is reduced to a minimum acceptable level. Similarly, when the handsets 20, 22 are determined to be located near the edge of the telephone set's operating range, the level of power radiated by RF transceiver 122 can be increased to its maximum permitted level.

In one embodiment, the functions of the router 114, speech codec 116, and ADPCM module 118 are combined within a single digital signal processing (DSP) chip.

Figure 3:
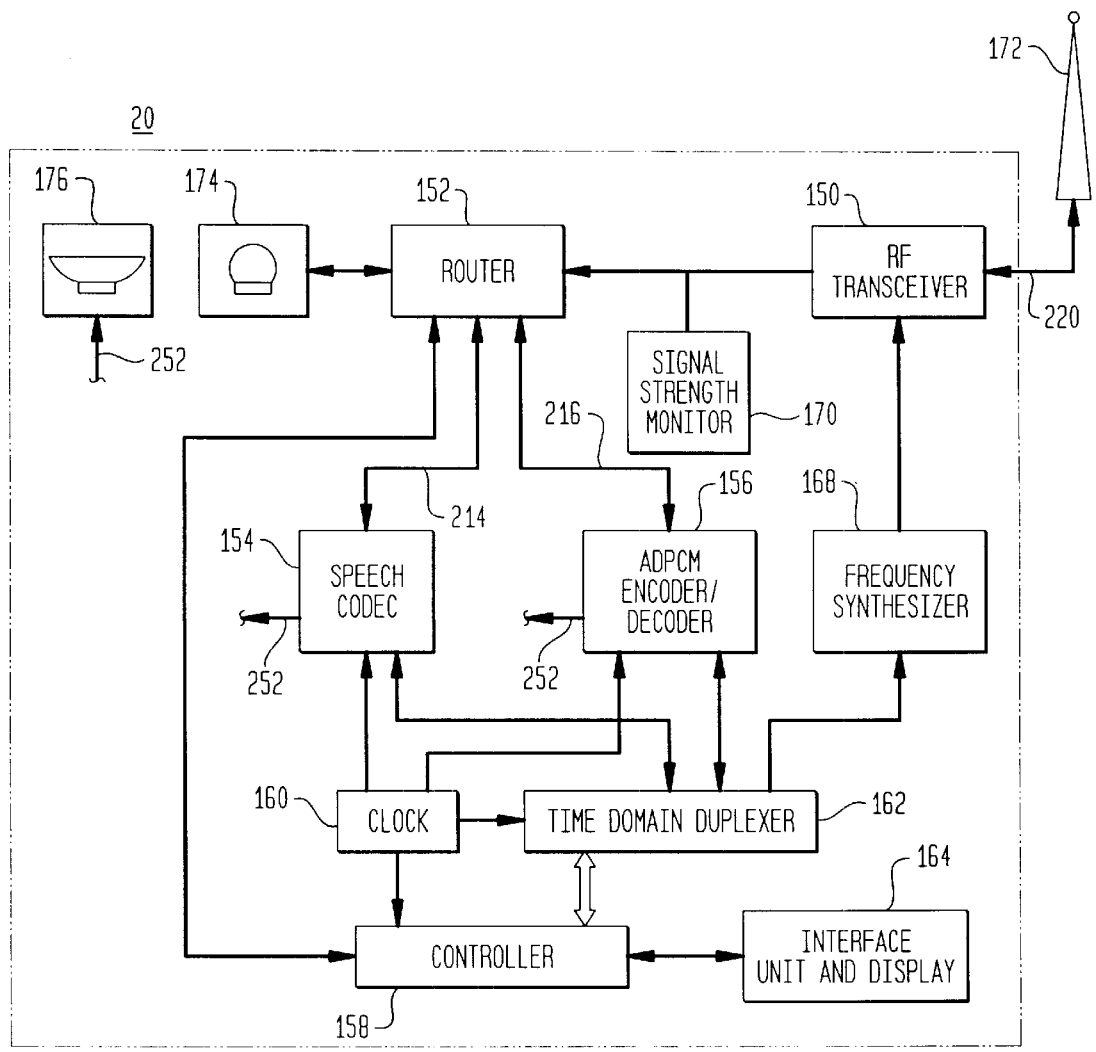
FIG. 3 illustrates a block diagram of circuitry located within a handset unit of the invention.

FIG. 3 depicts a block diagram of circuitry located within a handset 20. Included within the handset 20 are a controller 158, a router 152, a clock 160 for providing synchronization to: 1) the controller 158, 2) a time domain duplexer (TDD) 162 and 3) the speech codec 154 and ADPCM module 156. Also included in the handset 20 are an RF transceiver 150, a signal strength monitor circuit 170, an antenna 172 and a frequency synthesizer 168. An interface unit and display 164 contains switches and a visual display for configuring the handset 20 in an appropriate mode for communicating with the base station 10 as well as permits dialing telephone digits and selecting such functions as talk, intercom and page modes for the handset 20 to communicate with the base station 10. Handsets 20 and 22 contain the same components and are operationally identical.

The transceiver 150 comprises both an RF transmitter and an RF receiver. This transceiver 150 demodulates voice signals transmitted by the base station 10 and couples these signals via the router 152 and either the speech codec 154 or ADPCM module 156 to a speaker 176 on line 252. The transceiver 150 also has as its input digital speech signals which have been transmitted from a microphone 174 in analog form through router 152, speech codec 154 or ADPCM module 156, TDD 162, and frequency synthesizer 168. Either the ADPCM module 156 or speech codec 154 is used to convert the analog signal to a digital signal which is then provided to the RF transceiver 150. The signal strength monitor 170 monitors the received signal level from the base station 10 and accordingly varies the level of the output power radiated by the 1I transceiver 150 in proportion to this received signal level.

In one embodiment, the functions of the router 152, speech codec 154, and ADPCM module 156 are combined within a single digital signal processing (DSP) chip.

Each of the handsets 20, 22 must be provided with a security code from the base station 10 during a registration process in order for subsequent radio frequency communications to take place between the base station 10 and a handset 20, 22 or between handsets 20, 22. When an RF signal is received from a base station 10, the control unit 158 enables the TDD 162 to establish synchronization with the RF signal being received from the base station 10. This may be accomplished by tie base station 10 transmitting a unique identification code which must be registered by the individual handset 20, 22. The security code data is generated in the base station in accordance with the teachings of U.S. Pat. No. 4,736,404 (R. E. Anglikoivski et al.), incorporated herein by reference. The starting channel data is a pseudo-random number seed. This seed, used for generating the starting channel and also random subsequent channels, is generated by the control unit in the base station. The handset unit automatically acknowledges to the base station when it has received the security code data and the starting channel data. Once this data has been received and acknowledged, both the base station and the handset unit begin frequency hopping in the manner described in U.S. Pat. No. 5,353,341 (M. E. Gillis et al.), incorporated herein by reference.

Figure 4:
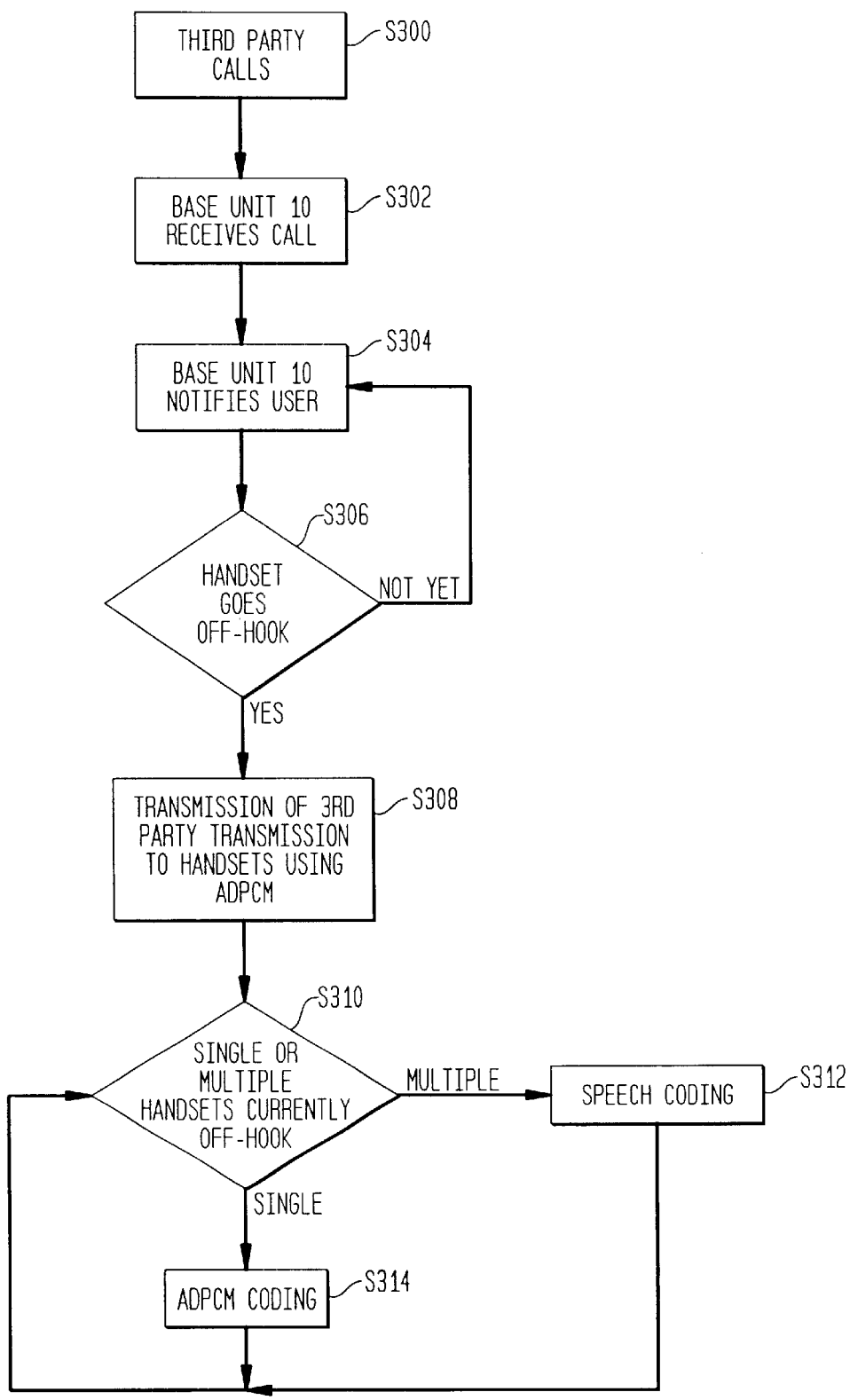
FIG. 4 illustrates a flowchart describing the handshaking required between the handsets and the base station of FIG. 1.

Turning now to FIG. 4, a flowchart depicts, in more detail, the operation of the present invention. Starting with step S300, a third party calls a subscriber. The incoming telephone signal is received by the base station 10 in step S302 and routed through the line interface 112 to the router 114 on line 200. Upon detection of an incoming telephone signal, the controller 110 signals a user that an incoming call has been received in step S304. Such signaling may occur, for example, by the use of an audio alarm contained in the base station 10 or by a signal generated within the base and transmitted to the handsets 20, 22. The controller 110 monitors the input of router 114 received from RF transceiver 122 until an off-hook signal has been received from at least one handset 20, 22 in step S306.

Controller 110 controls the router 114 such that the incoming remote signal is routed through the ADPCM module 118. The ADPCM module 118 encodes the incoming remote signal using ADPCM encoding techniques known in the art such as, for example, G.726 compliant ADPCM techniques. The encoded signal is routed through the TDD 124, frequency synthesizer 128, and RF transceiver 122 for RF transmission to the handsets 20, 22 in step S308.

Once transmission of an incoming telephone call has begun outgoing transmissions originating from the handsets 20, 22 are now possible. Upon going off-hook through, for example, depression of a specified key by the user in step S306, a handset 20, 22 generates an off-hook control signal which is transmitted to the base station 10 to be detected by the controller 110. Dependant upon the number of off-hook handsets 20, 22 the controller 11 has detected in step S310, being one or more than one, the controller 110 generates a control signal transmitted to the handsets 20, 22 to encode outgoing signals using either the ADPCM module 118 in step S314 or the speech codec 116 in step S312, respectively. The speech codec 116 is preferably circuitry designed to encode and decode speech on 4, 8 or 16 Kb/s digital channels through techniques such as, for example, waveform coding, linear coding (PCM), differential coding (DPCM), frequency-domain coding, or parametric coding (a vocoder such as format vocoder (synthesizer) or an LPC vocoder). The speech codecs 116 and 154 may be permanently configured to encode and decode speech based upon 4, 8 or 16 Kb/s digital channels or may be dynamically configurable to process on 4, 8, and 16 Kb/s channels the choice of which is determined by the number of off-hook handsets the controller 110 detects. Any change in off-hook status will force the controller 110 to recalculate the current number of off-hook handsets 20, 22 and send control signals to the handsets 20, 22 instructing them to route the outgoing signals through either the speech codec 116 if more than handset 20,22 is off-hook or the ADPCM module 118 if only one handset 20 or 22 is off-hook. Multiple simultaneous signals received by the base station 10 from the handsets 20 share the speech codec 116 through a time division system controlled by the controller 110 and the router 114. Alternatively, one speech codec unit 154 may be present for each handset 20, 22. The continuous monitoring of the off-hook status of the handsets 20, 22 by the base station 10 in step S310 continues until the telephone call has been terminated.

In one embodiment of the present invention, the handsets 20, 22 are capable of communication with each other through the use of control/identification signals such as those described in U.S. Pat. No. 5,809,417 (Nealon et al.) and incorporated herein by reference. In the case in which multiple handsets 20, 22 are currently off-hook, outgoing communications signals are encoded using the speech codec 154 and may be accompanied by a control signal also generated by the speech codec 154. Upon receipt of a speech coded RF signal, the controller 158 recognizes the signal as being speech coded through the use of tie accompanying control signal. The controller 158 routes the signals through router 152 to the speech codec 154 for decoding before transmission to the speaker 176 on line 252. Incoming signals which are not accompanied by a control signal or have a control signal corresponding to ADPCM encoding are presumed to come from the base 10 and have been ADPCM encoded. The controller 158 routes such signals to the ADPCM module 156.

In another embodiment of the present invention, the handsets 20, 22 communicate to one another through the base station 10. An outgoing signal generated by handset 20 is speech coded by speech codec 154 and transmitted to base station 10. Base station 10 may configured to either automatically rebroadcast the speech coded signal using the router 114 or to decode the incoming signal using speech codec 116. If the signal is decoded, it must be encoded again, preferably using the ADPCM module 118 to preserve voice quality transmission. The signal is preferably immediately rebroadcast due to the signal loss experienced by double encoded signals.

It should be readily apparent that although only two cordless telephone handsets 20, 22 have been depicted in the multi-cordless environment for purposes of simplicity, any number of cordless telephone handsets 20, 22 with a single base station 10 may be used in successfully practicing the invention. Furthermore, the invention may be successfully implemented within any cordless telephone environment employing an RF link between a handset and a base station. It should also be noted that the invention's usefulness is not limited to an RF link of any one specific frequency. Also, although the invention is described using frequency division duplexing techniques, other multiplexing techniques such as time division multiplexing can also be used.

In addition, while a preferred embodiment of the invention's implementation within a multi-cordless environment has been described, it should be readily apparent that any configuration and/or combination of hardware may be used to perform the same, or similar operations as those performed by the FIG. 2 and FIG. 3 block diagrams. While specific circuitry has been depicted as being located within a base station, design modifications may be made such that the circuitry is located within a handset, and vice versa. For example, while the control signals are depicted as being generated within the base station 10, alternatively, some of those signals may be generated within the handsets 20, 22. Accordingly, the invention is not limited by the foregoing description or drawings, but is only limited by the scope of the appended claims.

What is claimed as new and desired to be protected by Letters Patent of the United States is:

1. A multiple-handset cordless telephone comprising:
   a plurality of handset units, each of said plurality of handset units being fully detachable from a base station and capable of simultaneously transmitting and receiving a telephone signal to and from said base station, each of said handset units having at least first and second encoding/decoding circuitry, said first encoding/decoding circuitry being used when one of said plurality of handset units is in an off-hook state and said second encoding/decoding circuitry being used when more than one of said plurality of handset units is in an off-hook state;

a base station capable of transmitting and receiving a telephone signal to and from said plurality of handsets units, said base station having at least said first and said second signal encoding/decoding circuitry, said first base station encoding/decoding circuitry being used when one of said plurality of handset units is in an off-hook state and said second base station encoding/decoding circuitry being used when more than one of said plurality of handset units is in an off-hook state.

2. The telephone of claim 1, wherein said base station further comprises:

a first controller for selectively routing the transmitted telephone signal originating in said base station to said first encoding/decoding circuitry and the received telephone signal from said plurality of handset units to said first or second encoding/decoding circuitry in accordance with said plurality of handset units being in a first or second state, respectively; and first signal transmission circuitry for transmitting the telephone signal from said base station and receiving the telephone signal from said plurality of handset units, said first signal transmission circuitry being coupled to said first controller and said first and second encoding/decoding circuitry.

3. The telephone of claim 2, wherein each of said plurality of handset units further comprises:

a second controller for selectively routing the received telephone signal from said base station to said first encoding/decoding circuitry and the transmitted telephone signal originating in said handset unit to said first or second encoding/decoding circuitry in accordance with said plurality of handset units being in a first or second state, respectively; and second signal transmission circuitry for transmitting the telephone signal from said handset unit and receiving the telephone signal from said base station, said second signal transmission circuitry being coupled to said second controller and said first and second encoding/decoding circuitry.

4. The telephone of claim 3, wherein said first state occurs when one of said plurality of handset units is in an off-hook state and said second state occurs when more than one of said plurality of handset units is in an off-hook state.

5. The telephone of claim 4, wherein said first encoding/decoding circuitry operates at a first coding rate and said second encoding/decoding circuitry operates at a second coding rate.

6. The telephone of claim 3, wherein said second controller includes a microprocessor.

7. The telephone of claim 6, wherein said first controller includes an analog switch for routing the telephone signals in response to control signals from said microprocessor.

8. The telephone of claim 3, further comprising a digital signal processing (DSP) chip.

9. The telephone of claim 8, wherein at least one of said first and second encoding/decoding circuitry is contained within said DSP chip.

10. The telephone of claim 3, wherein said second controller generates a first control signal corresponding to the speech coding rate at which an outgoing telephone signal has been coded and said first control signal is transmitted by said second signal transmission circuitry to said base station and other of said plurality of handset units.

11. The telephone of claim 10, said first controller generates a second control signal corresponding to the speech coding rate at which an outgoing telephone signal has been coded and said second control signal is transmitted by said first signal transmission circuitry to said base and other of said plurality of handset units.

12. The telephone of claim 11, wherein said first and second controller arc arranged to receive said first and second control signal from said first and second signal transmission circuitry, respectively, and route the accompanying incoming telephone signal to said first or second encoding decoding circuitry in response to said first and second control signal.

13. The telephone of claim 2, wherein said first controller generates a control signal for directing said second controller to selectively route the outgoing telephone signal to said ADPCM circuitry when said plurality of handset units is said first state and to said speech codec when said plurality of handset units is in said second state.

14. The telephone of claim 2, wherein said first controller includes a microprocessor.

15. The telephone of claim 14, wherein said first controller further includes an analog switch for routing the telephone signals in response to control signals from said microprocessor.

16. The telephone of claim 2, further comprising a digital signal processing chip.

17. The telephone of claim 16, wherein at least one of said first and second encoding/decoding circuitry is contained within said DSP chip.

18. The telephone of claim 2, wherein said first and second signal transmission circuitry is arranged to operate in a frequency division duplexing mode.

19. The telephone of claim 18, wherein said first signal transmission circuitry comprises:

a clock providing a timing, signal;

a time domain duplexer, said time domain duplexer connected to said first controller and said clock for controlling the frequencies used in frequency division duplexing;

a frequency synthesizer connected to said time domains duplexer for providing a frequency hopping cycle according to input received from said time domain duplexer; and a radio frequency (Re) transceiver connected to said first controller and said frequency synthesizer for transmitting and receiving telephone signals to and from said plurality of handset units.

20. The telephone of claim 18, wherein said second signal transmission circuitry comprises:

a clock providing a timing signal;

a time domain duplexer, said time domain duplexer connected to said second controller and said clock for controlling the frequencies used in frequency division duplexing;

a frequency synthesizer connected to said time domain duplexer for providing a frequency hopping cycle according to input received from said time domain duplexer; and a radio frequency (RF) transceiver connected to said second controller and said frequency synthesizer for transmitting and receiving telephone signals to and from said plurality of handset units.

21. The telephone of claim 2, wherein said first signal transmission circuitry is arranged to operate in time division multiplexing mode.

22. The telephone of claim 1, wherein said first encoding/decoding circuitry includes adaptive pulse code modulation (ADPCM) circuitry.

23. The telephone of claim 22, wherein said ADPCM circuitry operates at a coding rate of no higher than 32 kilobits per second.

24. The telephone of claim 1, wherein said second signal encoding/decoding circuitry includes a speech codec unit.

25. The telephone of claim 1, wherein said second speech encoding/decoding circuitry is arranged to encode and decode speech with a rate no greater than 4 kilobits per second.

26. The telephone of claim 1, wherein said second speech encoding/decoding circuitry is arranged to encode and decode speech with a rate no greater than 8 kilobits per second.

27. The telephone of claim 1, wherein said second speech encoding/decoding circuitry is arranged to encode and decode speech with a rate no greater than 16 kilobits per second.

28. The telephone of claim 1, wherein said second controller generates a status signal corresponding to a change in the on-hook/off-hook status of a respective one of said handset units and transmits the status signal to said base station using said second signal transmission circuitry.

29. A handset for use in a multi-handset cordless telephone environment, said handset being fully detachable from a base station and capable of simultaneously transmitting and receiving a telephone signal to and from a base station and other handsets, said handset comprising:
at least first and second encoding/decoding circuitry, wherein said first encoding/decoding circuitry is used to encode or decode the telephone signal when a first control signal is received indicating that one handset in said multi-handset cordless environment is in an off-hook condition; and wherein
said second encoding/decoding circuitry is used to encode or decode the telephone signal when a second control signal is received indicating that at least two handsets in said multi-handset cordless environment are in an off-hook condition.

30. The handset of claim 29, wherein said handset further comprises:
a controller for selectively routing the transmitted telephone signal from said handset and/or the received telephone signal from a base station or other handset to said first encoding/decoding circuitry when said first control signal is received and to said second encoding/decoding circuitry when said second control signal is received; and
signal transmission circuitry for transmitting the telephone signal to said base station and other handsets and for receiving the telephone signal from said base station and other handsets, said signal transmission circuitry being coupled to said controller and said first and second encoding/decoding circuitry.

31. The handset of claim 30, wherein said first control signal is generated by a base station or another handset.

32. The handset of claim 31, wherein said first encoding/decoding circuitry operates at a first coding rate and said second encoding/decoding circuitry operates at a second coding rate.

33. The handset of claim 30, wherein said controller generates a status signal corresponding to a change in the on-hook/off-hook status of said handset and transmits the status signal to said base station using said signal transmission circuitry.

34. The handset of claim 30, wherein said controller includes a microprocessor.

35. The handset of claim 34, wherein said controller further includes an analog switch for routing the telephone signals in response to control signals from said microprocessor.

36. The handset of claim 30, wherein said signal transmission circuitry is arranged to operate in frequency division duplexing mode.

37. The handset of claim 36, wherein said signal transmission circuitry comprises:
a clock providing a timing signal;
a time domain duplexer, said time domain duplexer connected to said controller and said clock for controlling the frequencies used in frequency division duplexing;
a frequency synthesizer connected to said time domain duplexer for providing a frequency hopping cycle according to input received from said time domain duplexer; and
a radio frequency (RF) transceiver connected to said controller and said frequency synthesizer for transmitting and receiving telephone signals to and from said handset.

38. The handset of claim 30, wherein said signal transmission circuitry is arranged to operate in a time division multiplexing mode.

39. The handset of claim 30, wherein said controller generates a first control signal corresponding to the speech coding rate at which an outgoing telephone signal has been coded, wherein said first control signal is transmitted by said signal transmission circuitry to the base station and other handsets.

40. The handset of claim 39, wherein said controller is arranged to receive a second control signal accompanying an incoming telephone signal and route the accompanying incoming telephone signal to said first or second encoding decoding circuitry in response to said second control signal.

41. The handset of claim 29, wherein said first encoding/decoding circuitry includes adaptive pulse code modulation (ADPCM) circuitry.

42. The handset of claim 41, wherein said ADPCM circuitry operates at a coding rate of no higher than 32 kilobits per second.

43. The handset of claim 29, wherein said second signal encoding/decoding circuitry includes a speech codec unit.

44. The handset of claim 29, wherein said second signal encoding/decoding circuitry is arranged to encode and decode speech with a rate no greater than 4 kilobits per second.

45. The handset of claim 29, wherein said second signal encoding/decoding circuitry is arranged to encode and decode speech with a rate no greater than 8 kilobits per second.

46. The handset of claim 29, wherein said second signal encoding/decoding circuitry is arranged to encode and decode speech with a rate no greater than 16 kilobits per second.

47. The handset of claim 29, further comprising a digital signal processing chip.

48. The handset of claim 47, wherein at least one of said first and second encoding/decoding circuitry is contained within said DSP chip.

49. A base station for use in a multi-handset cordless telephone environment, said base being capable of simultaneously transmitting and receiving a telephone signal to and from a plurality of handsets, wherein said base station has at least first and second encoding/decoding circuitry, said first encoding/decoding circuitry being used to decode the incoming telephone signal when a first state is detected and said second encoding/decoding circuitry being used to decode the incoming telephone signal when a second state is detected, wherein said first state occurs when one of said plurality of handsets is in an off-hook state and said second state occurs when more than one of said plurality of handsets is in an off-hook state.

50. The base station of claim 49, wherein said base station further comprises:
   a controller for selectively routing the transmitted telephone signal from said base station to said first encoding/decoding circuitry and the received telephone signal from said plurality of handset units to said first encoding/decoding circuitry when said first state is detected and to said second encoding/decoding circuitry when said second state is detected; and
   signal transmission circuitry for transmitting the telephone signal from said base station and receiving the telephone signal from said plurality of handsets, said signal transmission circuitry being coupled to said controller and said first and second encoding/decoding circuitry.

51. The base station of claim 50, wherein said controller receives a status signal corresponding to a change in the on-hook/off-hook status of said plurality of handsets through said signal transmission circuitry from each of said plurality of handsets.

52. The base station of claim 50, wherein said controller includes a microprocessor.

53. The base station of claim 52, wherein said controller further includes an analog switch for routing the telephone signals in response to control signals from said microprocessor.

54. The base station of claim 50, further comprising a digital signal processing chip.

55. The base station of claim 54, wherein at least one of said first and second encoding/decoding circuitry is contained within said DSP chip.

56. The base station of claim 50, wherein said signal transmission circuitry is arranged to operate in a frequency division duplexing mode.

57. The base station of claim 56, wherein said signal transmission circuitry comprises:
   a clock providing a timing signal;
   a time domain duplexer, said time domain duplexer connected to said controller and said clock for controlling the frequencies used in frequency division duplexing;
   a frequency synthesizer connected to said time domain duplexer for providing a frequency hopping cycle according to input received from said time domain duplexer; and
   a radio frequency (RF) transceiver connected to said controller and said frequency synthesizer for transmitting and receiving telephone signals to and from said base station.

58. The base station of claim 50, wherein said signal transmission circuitry is arranged to operate in a time division multiplexing mode.

59. The base station of claim 50, wherein said controller generates a first control signal corresponding to the speech coding rate at which an outgoing telephone signal has been coded, wherein said first control signal is transmitted by said signal transmission circuitry to said plurality of handsets.

60. The base station of claim 59, wherein said controller is arranged to receive a second control signal accompanying an incoming telephone signal from said plurality of handsets through said signal transmission circuitry and route the accompanying incoming telephone signal to said first or second encoding decoding circuitry in response to said second control signal.

61. The base station of claim 49, wherein said first encoding/decoding circuitry operates at a first coding rate and said second encoding/decoding circuitry operates at a second coding rate.

62. The base station of claim 49, wherein said first encoding/decoding circuitry includes adaptive pulse code modulation (ADPCM) circuitry.

63. The base station of claim 62, wherein said Al)PCM circuitry operates at a coding rate of no higher than 32 kilobits per second.

64. The base station of claim 49, wherein said second signal encoding/decoding circuitry includes a speech codec unit.

65. The base station of claim 49, wherein said second signal encoding/decoding circuitry is arranged to encode and decode speech with a rate no greater than 4 kilobits per second.

66. The base station of claim 49, wherein said s second signal encoding/decoding circuitry is arranged to encode and decode speech with a rate no greater than 8 kilobits per second.

67. The base station of claim 49, wherein said second signal encoding/decoding circuitry is arranged to encode and decode speech with a rate no greater than 16 kilobits per second.

68. A method for dynamically maintaining high quality speech in a multi-handset cordless telephone environment, the method comprising:
   monitoring the number of a plurality of handset units assigned to a base station which are currently in an off-hook state;
   routing an incoming remote telephone signal through first encoding/decoding circuitry within said base station for transmission to said plurality of handsets;
   routing radio frequency (RF) telephone signals originating at said plurality of handsets through first encoding/decoding circuitry within each of said plurality of handset units and said base station if the number of said plurality of handset units currently off-hook is equal to one;
   routing radio frequency (RF) telephone signals originating at said plurality of handsets through second encoding/decoding circuitry within said base station and each of said plurality of handset units if the number of said plurality of handset units currently off-hook is greater than one; and
   transmitting RF telephone signals between said base station and said plurality of handset units.

69. The method as in claim 68, wherein said act of monitoring further comprises the steps of generating status signals within each of said plurality of handset units corresponding to the on-hook/off-hook state of each of said plurality of handset units and receiving said status signals at said base station.

70. The method of claim 69, wherein said step of receiving said status signals is accomplished by monitoring a radio frequency signal originating from said plurality of handset units at said base station.

71. The method as in claim 68, wherein said steps of routing arc accomplished under control of at least one microprocessor in each of said base and said plurality of handset units.

72. The method as in claim 71, wherein said steps of routing are conducted through at least one analog switch in each of said base and said plurality of handset units which are controlled by a respective microprocessor.

73. The method as in claim 68, wherein said first encoding/decoding circuitry operates at a first coding rate and said second encoding/decoding circuitry operates at a second coding rate.

74. The method as in claim 68, wherein said first encoding/decoding circuitry is a digital signal processing chip.

75. The method as in claim 68, wherein said second encoding/decoding circuitry is a digital signal processing chip.

76. The method as in claim 68, wherein said first encoding/decoding circuitry includes adaptive pulse code modulation (ADPCM) circuitry.

77. The method as in claim 68, wherein said ADPCM circuitry operates at a coding rate of no higher than 32 kilobits per second.

78. The method as in claim 68, wherein said second signal encoding/decoding circuitry includes a speech codec unit.

79. The method as in claim 68, wherein said second signal encoding/decoding circuitry is arranged to encode and decode speech with a rate no greater than 4 kilobits per second.

80. The method as in claim 68, wherein said second signal encoding/decoding circuitry is arranged to encode and decode speech with a rate no greater than 8 kiobits per second.

81. The method as in claim 68, wherein said second signal encoding/decoding circuitry is arranged to encode and decode speech with a rate no greater than 16 kilobits per second.

82. The method as in claim 68, wherein said step of transmission is accomplished by operating in a frequency division duplexing mode.

83. The method as in claim 82, wherein said step of transmission further comprises:

generating control signals for controlling the frequencies used in frequency division duplexing responsive to a timing signal; and applying a frequency hopping cycle to the RF telephone signals responsive to said control signals.

84. The method as in claim 68, wherein said step of transmission is accomplished by operating in a time division multiplexing mode.

* * * * *